F. N. CONNET & A. W. GRAHAM.
VALVE.
APPLICATION FILED NOV. 21, 1907.
944,416.
Patented Dec. 28, 1909.
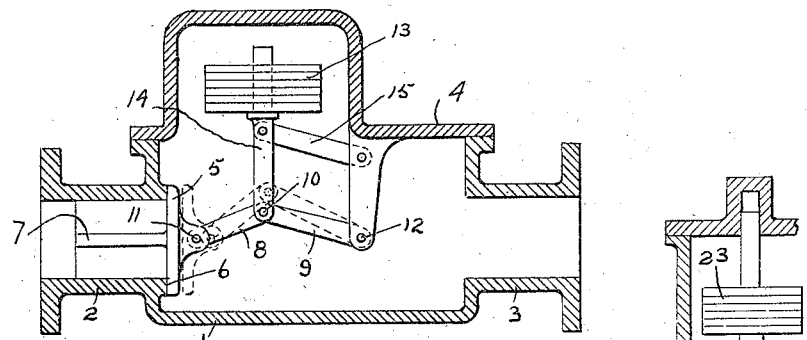
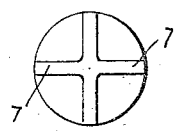
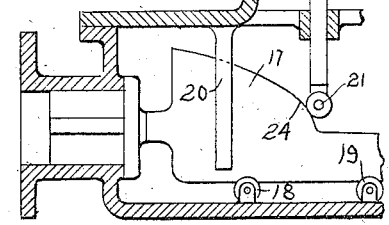
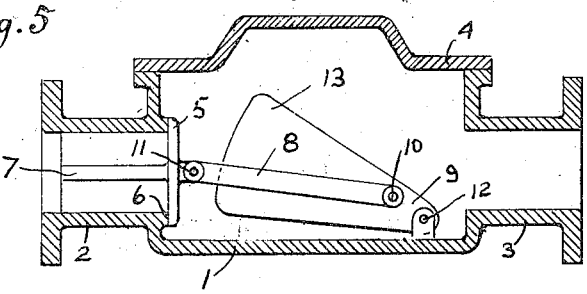
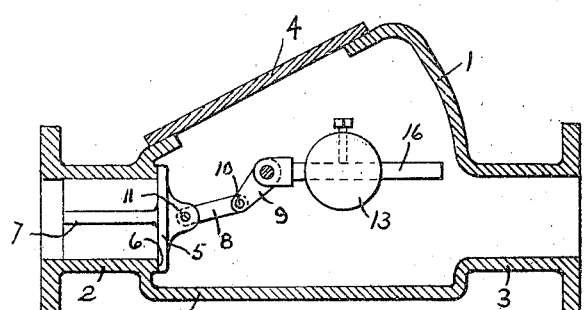
Witnesses
John F. Cavanagh
E. D. Ogden
Inventors
Frederick N. Connet
Arthur W. Graham
By
Howard E. Barlow
Attorney

UNITED STATES PATENT OFFICE.

FREDERICK N. CONNET AND ARTHUR W. GRAHAM, OF PROVIDENCE, RHODE ISLAND, ASSIGNORS TO BUILDERS IRON FOUNDRY, OF PROVIDENCE, RHODE ISLAND, A CORPORATION OF RHODE ISLAND.

VALVE.

944,416.  Specification of Letters Patent.   Patented Dec. 28, 1909.

Application filed November 21, 1907. Serial No. 403,135.

*To all whom it may concern:*

Be it known that we, FREDERICK N. CONNET and ARTHUR W. GRAHAM, citizens of the United States, residing at the city of Providence, in the county of Providence and State of Rhode Island, have invented certain new and useful Improvements in Valves, of which the following is a specification, reference being had therein to the accompanying drawing.

This invention relates to valves and has for its object to provide a valve that is adapted to open and close automatically, the same being arranged so as to require more power or pressure to open it than is required to hold it open after the same is in its open position.

The essential feature of the device is that the valve, on account of the action of its controlling weight, due to the angle of thrust, causes the same to remain closed until the pressure has risen to an amount sufficient to open the same, after which this angle of thrust is changed decreasing the effective action of the weight and allowing the valve to remain open until the pressure has been considerably reduced below the amount required to open it, thus the valve is effectually prevented from continually opening and closing as is the case with the ordinary check valve.

This valve may be used for any purpose for which it is adapted, but is more particularly designed to be used for controlling the direction of liquids through a compound meter whereby when the liquid acquires a certain velocity the valve automatically opens to allow the liquid to pass therethrough, but when the flow falls below a predetermined rate the valve closes automatically and causes the flow to pass around through a second or smaller meter.

In the operation of this valve, in the particular case pointed out, it will be seen to be very essential that the valve should not be allowed to open and close at each slight variation in the pressure but should remain closed until the pressure is sufficient to open it, after which it will remain open until the pressure has fallen considerably below the amount required to open it.

With these and other objects in view, the invention consists of certain novel features of construction, as will be more fully described and particularly pointed out in the appended claims.

In the accompanying drawings: Figure 1— is a sectional side elevation of the valve casing showing the mechanism contained therein, showing a powerful toggle joint arranged with a variable weight suspended over said joint. Fig. 2— shows a single weight pivoted to the casing and connected by a link to the valve, the manner of pivoting the weight itself forming one of the linking members. Fig. 3— is another form of toggle jointed valve showing the weight adjustably mounted to slide on one arm of the closing lever. Fig. 4— is a longitudinal slidable cam adapted to be operated by a weight through a contact roll. Fig. 5—is an end view of the valve showing the bearing wings.

Referring to the drawings 1 is the valve casing which may be made in any suitable form having an inlet opening 2 and an outlet opening 3. The casing is preferably made with a cap 4 through which the internal mechanism is inserted. A disk valve 5 is adapted to fit over and close the inlet opening in the casing where it is seated against the inner edge of said opening at 6. This valve is provided with the wings 7—7 which extend into the inlet opening to guide the valve as it slides to and from its seat.

In carrying out our invention we have provided a set of links 8 and 9 pivoted together at 10, one end of link 8 being pivoted at 11 to the valve, while the opposite end of link 9 is pivoted at 12 to the casing. The weight 13, in Fig. 1, is supported over this joint on the upright spindle 14, which spindle is pivoted at its lower end to the joint at 10 and is also supported and held in its upright position by means of a second link 15. Any required amount of weight 13 may be placed on this spindle 14.

In Fig. 2 the portion of the weight 13 between the points 10 and 12 serves as the second member 9 of the link.

In Fig. 3 the weight 13 may be adjusted along the horizontal arm of the lever 16 so as to readily regulate the action of the toggle joint on the valve.

In Fig. 4 a cam 17 is shown which is adapted to be moved longitudinally on the rollers 18 and 19 on which it is guided by the guide members 20. A roll 21 mounted on an upright shaft 22 is pressed downward by the weights 23. When the valve is on its seat this roll engages a very steep portion of the cam at 24, requiring considerable pressure to move it, but as the valve is pressed backward from its seat the roll is raised to a less steep portion of the cam where the effectiveness of the weight acting to close the valve is greatly reduced.

Our invention is not restricted to the construction and arrangement of the operating parts as herein shown and described, as any construction whereby the pressure required to open the valve must be greater than that required to hold the same open, would come within the spirit and scope of our invention.

Having thus described our invention, what we claim as new and desire to secure by Letters Patent, is:

1. A check valve comprising a casing, a valve and seat in said casing, a weighted link operatively connected to said valve, the link being so disposed angularly that the effective action of said weight will be reduced as the valve is being opened.

2. A check valve comprising a casing, a valve and seat in said casing, a weight pivotally mounted in said casing, a link operatively connected at one end to said valve and its opposite end to said weight whereby the latter is adapted to act as one of the link members and exert a differential pressure on said valve as the same is being opened.

In testimony whereof we affix our signatures in presence of two witnesses.

FREDERICK N. CONNET.
ARTHUR W. GRAHAM.

Witnesses:
W M. R. TILLINGHAST
Z. CHAFEE.